May 27, 1969
H. L. FRICK
3,446,941
OVEN HEATING MEANS
Filed Sept. 14, 1966
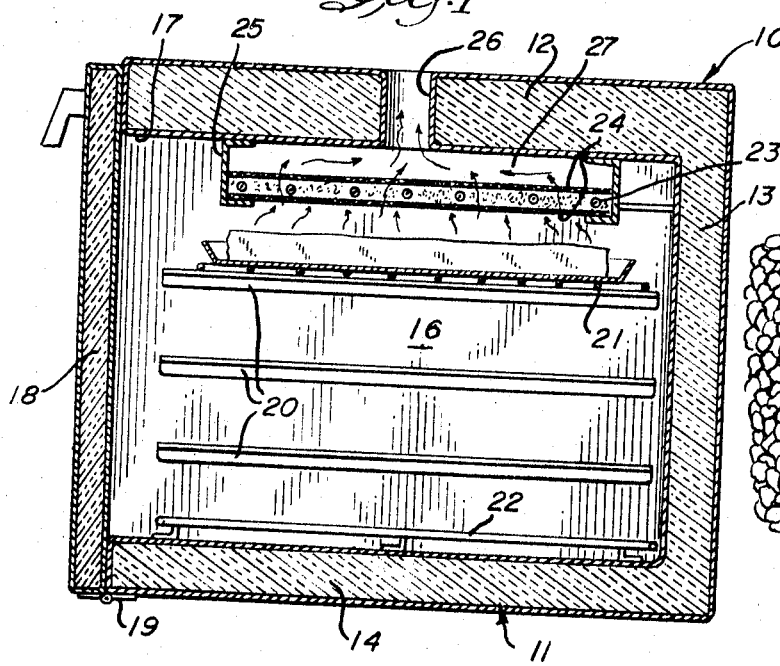
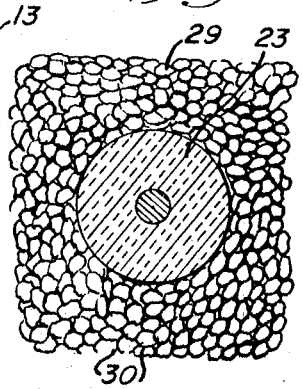
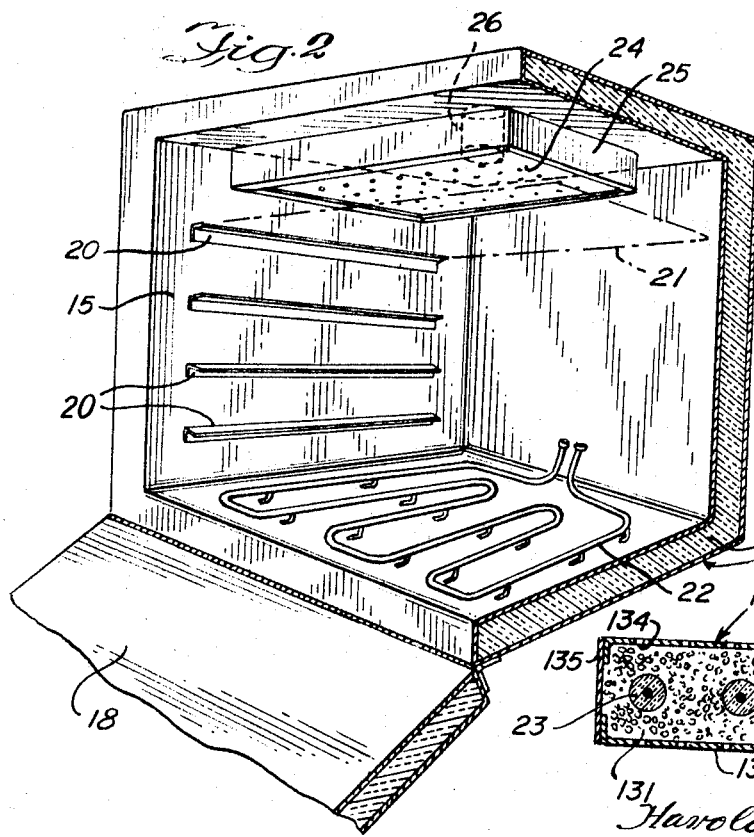
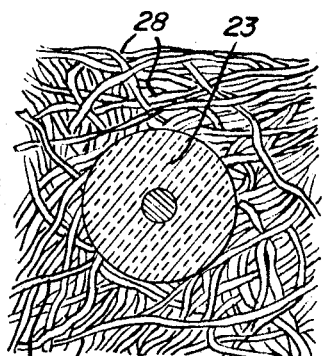
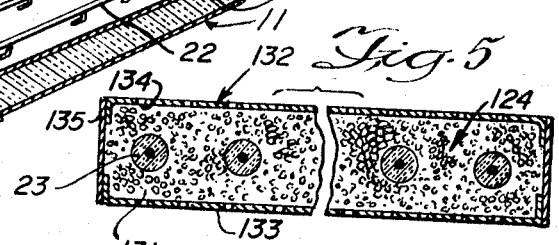
INVENTOR
Harold L. Frick
BY Hofgren, Wegner, Allen, Stellman & McCord
ATTORNEYS United States Patent Office 3,446,941
Patented May 27, 1969

3,446,941
OVEN HEATING MEANS
Harold L. Frick, Marion, Ohio, assignor to Whirlpool Corporation, a corporation of Delaware
Filed Sept. 14, 1966, Ser. No. 579,271
Int. Cl. F27d 11/02
U.S. Cl. 219—409                                    12 Claims

ABSTRACT OF THE DISCLOSURE

An oven provided with a heating element having a porous mass juxtaposed thereto whereby the element heats the mass to a preselected temperature for heating the oven chamber and concurrently causes combustion of combustible products such as smoke and grease in the oven chamber air prior to discharge of the air through said mass to the ambient atmosphere.

---

This invention relates to oven structures and in particular to means for causing air exhausted from an oven chamber to be substantially smoke-free and grease-free.

In one conventional form of oven structure for heating and cooking products, such as food products, an electric heating element is provided for heating the food products in the oven chamber. The conventional electrical heating elements produce hot spot areas by virtue of the spaced serpentine portions thereof thus nonuniformly heating the food products. Further, where the food products are such as produce smoke in the cooking process, it has been found necessary to exhaust the smoke into the ambient atmosphere as by leaving the front door of the oven cracked open. Where the oven is installed in a kitchen or the like, the discharge of the smoke into the kitchen atmosphere is highly undesirable. Still further, where the food product tends to throw off grease particles, as where the food product is meat and the oven heating unit is used as a broiler, the passage of the grease particles with the exhausting air is also highly undesirable. These undesirable characteristics of the conventional electric ovens have caused a substantial limitation on the acceptability of such electrical ovens and have presented a serious problem to the manufacturers thereof.

The present invention comprehends an improved oven structure eliminating the above discussed disadvantages of the known electrical oven structures in a novel and simple manner.

Thus, a principal feature of the present invention is the provision of a new and improved oven structure.

Another feature of the invention is the provision of such an oven structure having new and improved means for causing air exhausted from the oven chamber to be substantially smoke-free and grease-free.

A further feature of the invention is the provision of such an oven structure wherein new and improved means are provided for causing uniform extended distribution of heat energy provided by an electrical oven heating means for improved uniform heating of the oven chamber and products therein.

Still another feature of the invention is the provision of such an oven structure wherein a porous mass is provided in association with the electrical heating means to be heated thereby to a preselected temperature for heating the oven chamber and concurrently causing combustion of combustible products such as smoke and grease in the oven chamber air prior to discharge of the oven chamber air to the ambient atmosphere.

A yet further feature of the invention is the provision of such an oven structure wherein the oven wall is provided with an outlet opening and means are provided for supporting the porous mass across said opening for flow of the oven chamber air therethrough to outwardly of the oven.

Still another feature of the invention is the provision of such an oven structure wherein the porous mass is formed of metal.

A further feature of the invention is the provision of such an oven structure where the porous mass is formed of loose particles carried in a foraminous enclosure.

Still another feature of the invention is the provision of such an oven structure wherein the porous mass comprises particles joined together as by brazing or sintering.

Other features and advantages of the invention will be apparent from the following description taken in connection with the accompanying drawing wherein.

FIGURE 1 is a fore and aft vertical section of an oven structure embodying the invention.

FIGURE 2 is a fragmentary perspective thereof with portions broken away for facilitating illustration of the invention;

FIGURE 3 is a fragmentary enlarged vertical section of the porous mass structure thereof;

FIGURE 4 is a fragmentary enlarged vertical section of a modified form of porous mass structure embodying the invention; and FIGURE 5 is a fragmentary vertical section of still another modified form of porous mass structure embodying the invention.

In the exemplary embodiment of the invention as disclosed in FIGURES 1 through 3 of the drawing, an oven structure generally designated 10 is shown to comprise an insulated cabinet 11 having a top wall 12, rear wall 13, bottom wall 14 and side walls 15 defining an oven chamber 16 having a front opening 17 selectively closed by a door 18 swingably mounted on the cabinet 11 as by hinge structure 19. The side walls 15 may be provided with suitable vertically spaced horizontal ledges 20 for slidably supporting a rack 21 selectively at different levels in the chamber 16 intermediate the top wall 12 and bottom wall 14.

A first electrical heating element 22 may be provided adjacent bottom wall 14 for heating the oven chamber 16 as for baking food products in the oven chamber. A second electrical heating element 23 is provided subjacent the top wall 12. The electrical heating element 23 may comprise a conventional serpentine calrod type of heating element generally similar to the heating element 22, as shown in FIGURE 2. As illustrated in FIGURE 1, a porous mass 24 is disposed surrounding the heating unit 23 and effectively carried in a channel edge frame 25 subjacent the top wall 12. The top wall 12 further defines an outlet opening 26 opening to the space 27 within frame 25 above the porous mass 24 for conducting air exhausted upwardly through the porous mass from the oven chamber 16 to the ambient atmosphere.

As shown in FIGURES 3 and 4, the porous mass may be comprised of filamentary material 28 or pellet material 29 defining a plurality of interstitial passages 30 through which the air may flow in substatnial heat transfer association with the porous mass material. As shown in FIGURES 1, 3, and 4, the heating element 23 is effectively embedded in the porous mass so as to be in conductive heat transfer association therewith. The porous mass material may comprise suitable metallic material capable of sustaining high temperatures, such as at least approximately 1,200° F. Thus, the porous mass 24 may be heated to substantially the operating temperature of the heating element 23 so as to uniformly extend the heating means over the area within the frame 25 and thereby substantially improving the uniformity of the heating of the chamber 16. Such uniformity is of particular advantage as in the broiling of meat on the rack 21 carried on the uppermost ledges 20, as illustrated in FIGURE 1, as it eleminates localized hot spot effects as may occur with the conventional electric broiling operation relying on the relatively widely spaced turns of the heating element as the broiling heat source.

Still further, the provision of the porous mass 24 at the elevated broiling temperature causes smoke and grease particles in the air exhausting from the chamber 16 therethrough to undergo effectively complete combustion before the air passes upwardly through space 27 and opening 26 to the ambient atmosphere.

In the exemplary forms of the porous mass as shown in FIGURES 3 and 4, the particles may be bonded together as by brazing or sintering. In addition, if desired, the particles may be brazed or sintered to the heating element 23 to provide further improved heat transfer between the electrical heating element and the porous mass.

The invention further comprehends the provision of the porous mass as a mass of loose discrete particles retained by a suitable holder. Thus, as shown in FIGURE 5, a modified form of porous mass structure generally designated 124 may comprise a mass of discrete particles 131 carried in a foraminous enclosure 132 defined by a lower screen 133, an upper screen 134, and a side frame 135. The heating element 23 may extend through the porous mass 124 generally in the same manner as through mass 24 of structure 10 and functions substantially in the same manner to provide uniform heating and combustion of smoke and grease in the air passing upwardly therethrough.

While I have shown and described certain embodiments of my invention, it is to be understood that it is capable of many modifications. Changes, therefore, in the construction and arrangement may be made without departing from the spirit and scope of the invention as defined in the appended claims.

The embodiments of the invention in which an exclusive property or privilege is claimed are defined as follows:

1. In an oven having wall means defining a heating chamber, heating means in said oven comprising: means defining an outlet opening for exhausting air outwardly from said chamber; a porous mass formed of a highly thermally conductive material capable of sustaining a high temperature, said porous mass defining tortuous passages; means supporting said porous mass across said opening for flow of the exhausting air through a major portion of said passages of said porous mass; and means for substantially uniformly heating said porous mass to a high preselected temperature to heat said said chamber and to cause non-catalytic combustion of combustible products in said air whereby the air exhausted through said opening is effectively smoke-free and grease-free, said heating means being embedded in said porous mass to be in initimate thermally conductive relationship therewith whereby said porous mass is substantially immediately heated to said preselected temperature.

2. The oven heating means of claim 1 wherein said outlet opening means is disposed at the top of said chamber.

3. The oven heating means of claim 1 wherein said outlet opening means is disposed to conduct said air outwardly from said chamber by gravity flow.

4. The oven heating means of claim 1 wherein the porous mass is formed of metal.

5. The oven heating means of claim 1 wherein the porous mass is formed of joined particles.

6. The oven heating means of claim 5 wherein said particles are joined by brazing material.

7. The oven heating means of claim 5 wheerin said particles are joined by sintered connections.

8. The oven heating means of claim 1 wherein the porous mass is formed of loose particles, and said heating means includes a foraminous enclosure carrying said mass.

9. The oven heating means of claim 1 wherein said porous mass is formed of metal filaments.

10. The oven heating means of claim 1 further including means mechanically connecting the porous mass to the heating means.

11. The oven heating means of claim 1 wherein the porous mass is brazed to the heating means.

12. The oven heating means of claim 1 wherein the heating means comprises a serpentine electrical heating element embedded in the porous mass.

References Cited

UNITED STATES PATENTS

| | | | |
|---|---|---|---|
| 2,828,404 | 3/1958 | Long | 219—409 X |
| 3,290,483 | 12/1966 | Hurko | 219—409 X |
| 3,353,004 | 11/1967 | Alexander | 219—412 X |

BERNARD A. GILHEANY, *Primary Examiner.*

H. B. GELSON, *Assistant Examiner.*

U.S. Cl. X.R.

219—412